(12) United States Patent
Martelli

(10) Patent No.: US 6,348,023 B1
(45) Date of Patent: Feb. 19, 2002

(54) ENGINE-GEARBOX ASSEMBLY, IN PARTICULAR FOR MOTORCYCLES

(75) Inventor: Pier Paolo Martelli, Bologna (IT)

(73) Assignee: Magneti Marelli Spa (IT)

( * ) Notice: Subject to any disclaimer, the term of this patent is extended or adjusted under 35 U.S.C. 154(b) by 0 days.

(21) Appl. No.: 09/478,015

(22) Filed: Jan. 5, 2000

(30) Foreign Application Priority Data

Jan. 13, 1999 (IT) .......................................... TO99A0017

(51) Int. Cl.⁷ .............................................. B60K 41/04
(52) U.S. Cl. ........................... 477/107; 477/79; 477/87; 74/335
(58) Field of Search ........................... 477/107, 79, 80, 477/81, 83, 84, 85, 86, 87, 110

(56) References Cited

U.S. PATENT DOCUMENTS

| | | | |
|---|---|---|---|
| 4,524,843 A | * 6/1985 | Class et al. ................. | 180/179 |
| 5,360,381 A | * 11/1994 | Swist ......................... | 477/175 |
| 5,469,946 A | 11/1995 | Nguyen ..................... | 192/3.58 |
| 5,667,044 A | 9/1997 | Choi ......................... | 192/3.58 |
| 5,688,205 A | * 11/1997 | Buhler ....................... | 477/110 |
| 5,928,106 A | 7/1999 | Biros, Jr. et al. ............ | 477/81 |
| 6,003,395 A | * 12/1999 | Rogg et al. .................. | 74/335 |

FOREIGN PATENT DOCUMENTS

| | | |
|---|---|---|
| DE | 2053 685 | 7/1971 |
| GB | 2 308 874 A | 7/1997 |
| GB | 2 331 344 A | 5/1999 |

\* cited by examiner

Primary Examiner—Sherry Estremsky
Assistant Examiner—Tisha D. Lewis
(74) Attorney, Agent, or Firm—Moser, Patterson & Sheridan, L.L.P.

(57) ABSTRACT

An engine-gearbox assembly includes manual control (17, 22) for controlling the operation of a friction clutch (16) and the engagement of gears, and actuators (36, 38) for controlling, in a servo-assisted manner, the operation of the friction clutch (16) and the engagement of the gears independently from manual control (17, 22). An electronic control unit (32) is provided for controlling the actuators as a function of a command imparted by the driver.

8 Claims, 3 Drawing Sheets

ENGINE-GEARBOX ASSEMBLY, IN PARTICULAR FOR MOTORCYCLES

The present invention relates to an engine-gearbox assembly, in particular for motorcycles. Motorcycles are generally provided with a sequential non-synchronised gearbox. In traditional solutions, the members which intervene during a shifting operation are generally three: a hand grip for controlling the flow of fuel to the engine, a friction-clutch control lever and a pedal for selecting the gears.

The engine-gearbox assembly according to the present invention is characterized in that it comprises, in addition to the traditional manual control means, actuator means for controlling the operation of the friction-clutch and engagement of the gears, independently from the manual control means. An electronic control unit is provided for controlling said actuator means for shifting in a servo-assisted manner after having received a shifting command imparted by the driver, for instance by means of a pair of push-buttons.

With an assembly according to the present invention, the driver can carry out the shifting either in a servo-assisted manner by simply pushing a button, or in a manual manner by using the friction-clutch lever, the gas control hand grip and the pedal for selecting the gears, as in a normal motorcycle with manually-controlled gear shift.

Figure 1:
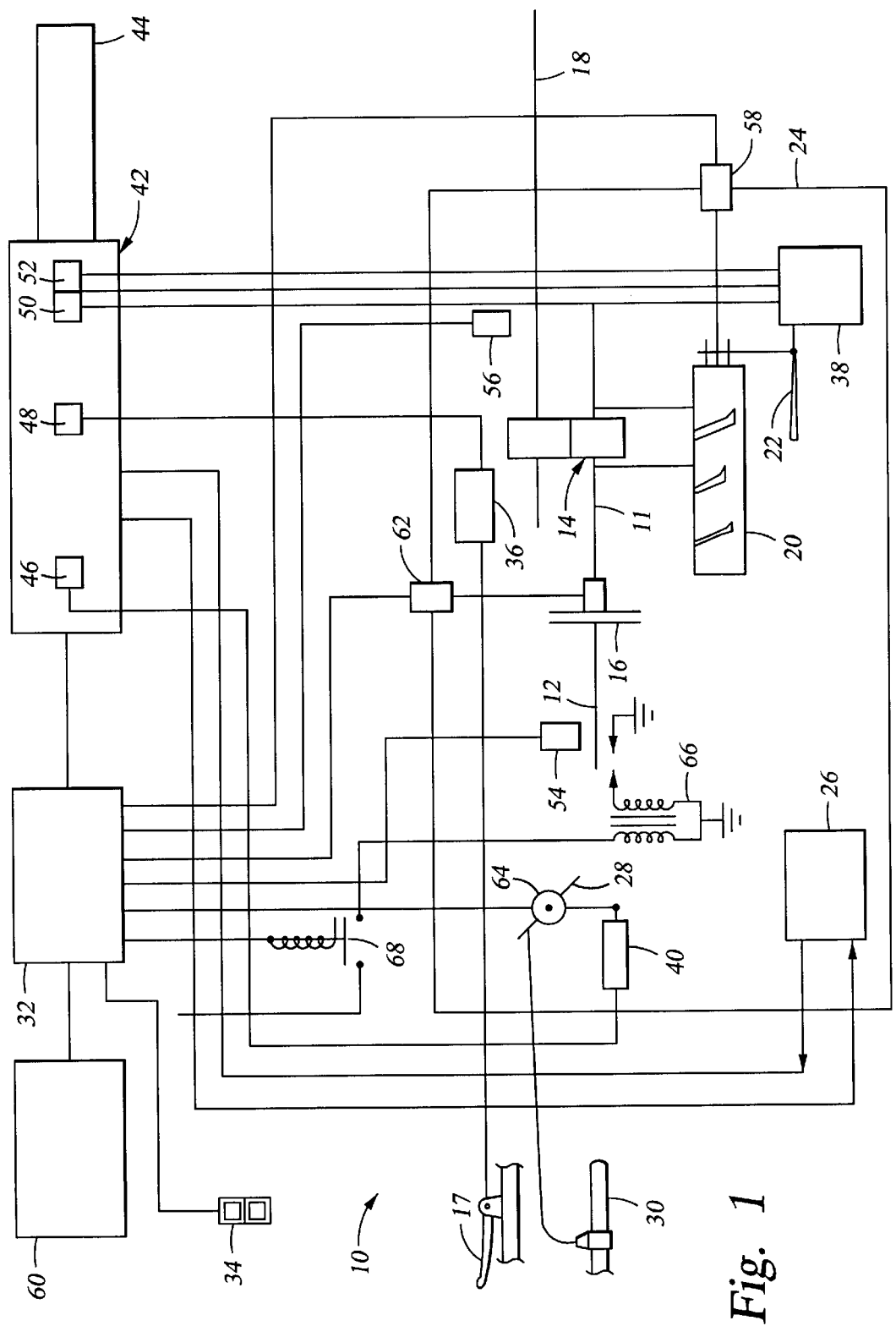
Figure 2:
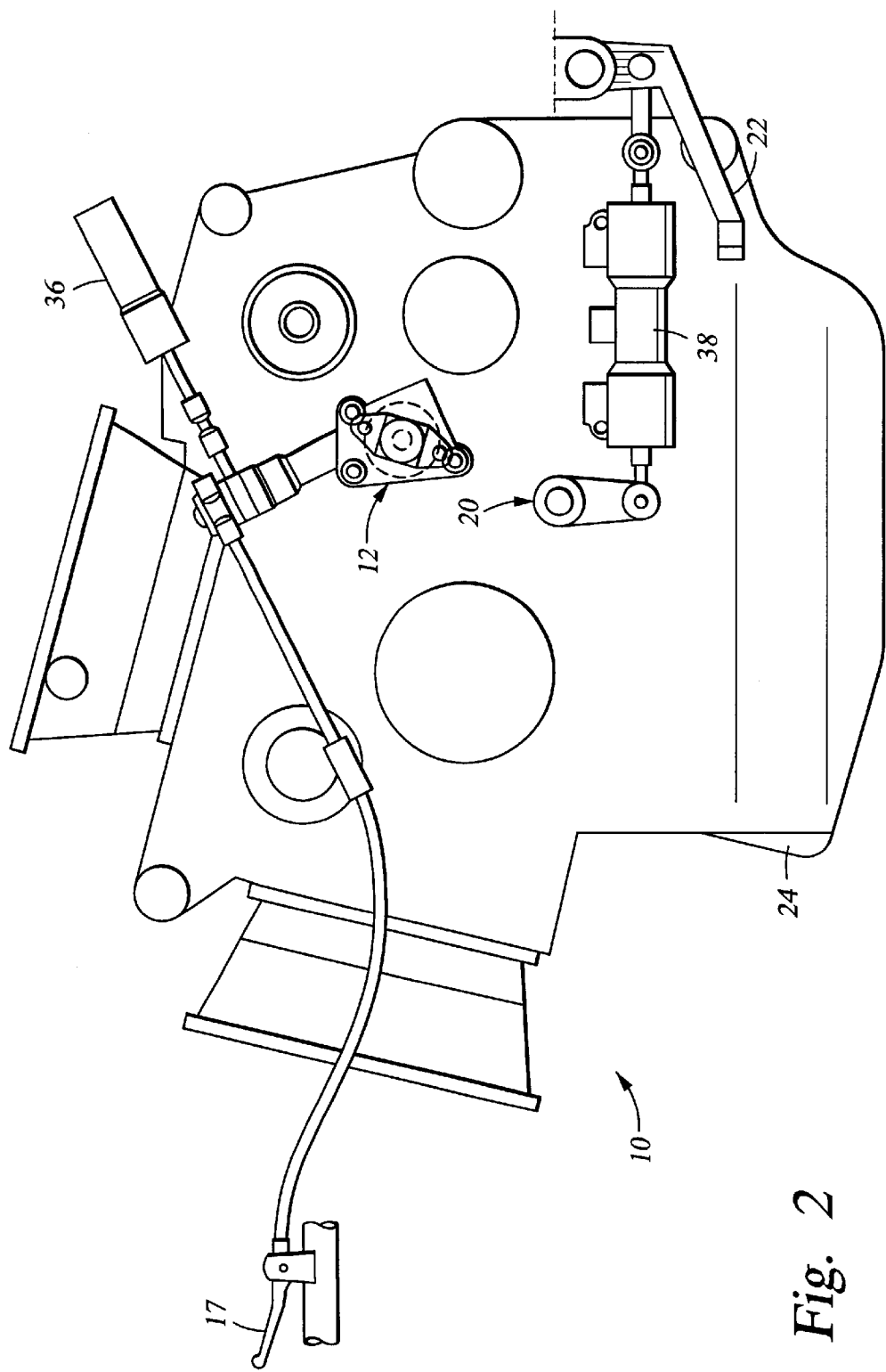
Figure 3:
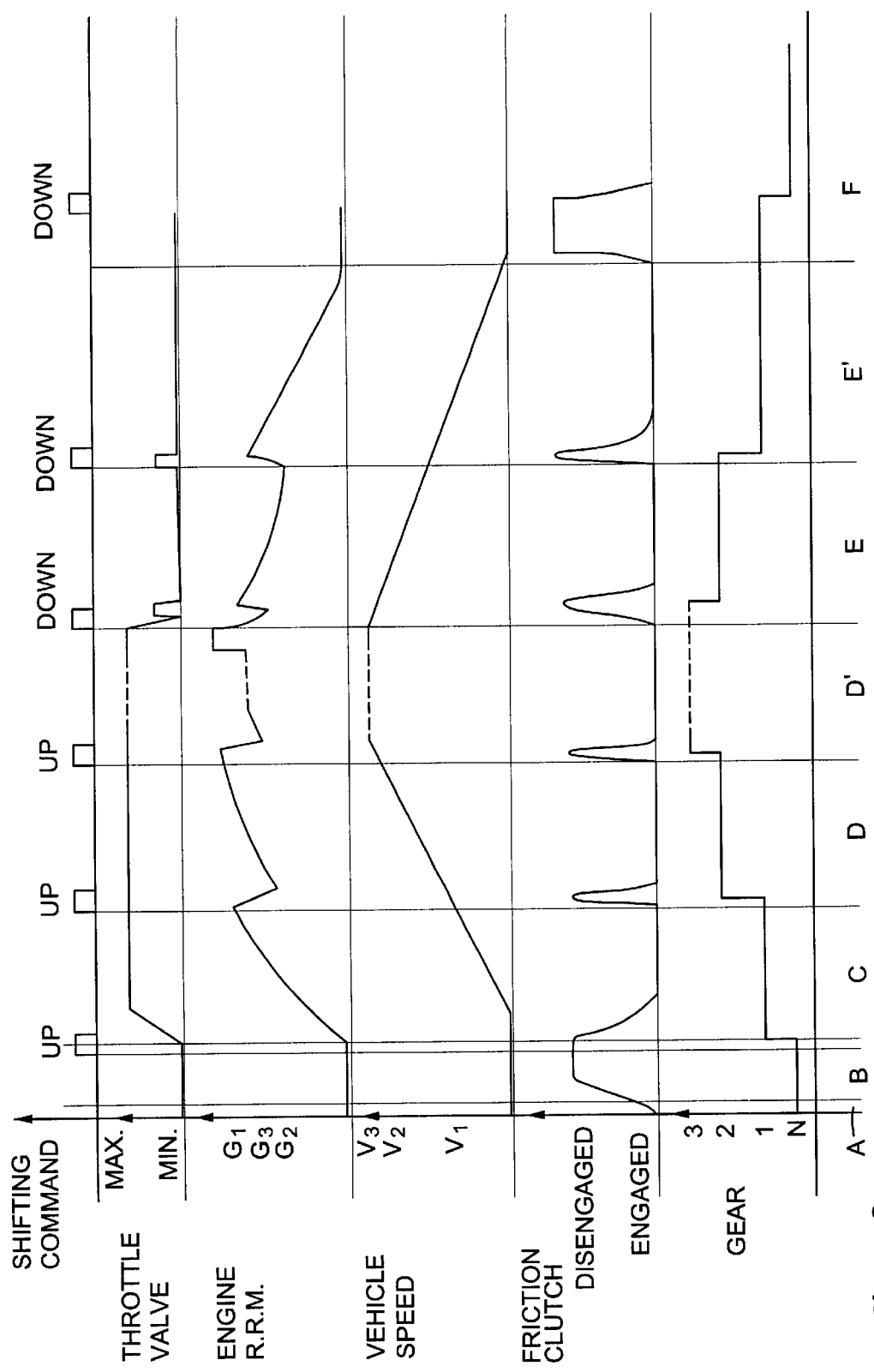

Characteristics and advantages of the present invention will become clear in the course of the detailed description which follows, given purely by way of non-limiting example, with reference to the attached drawings, in which:

FIG. 1 is a block diagram of an engine-gearbox assembly according to the present invention, FIG. 2 is a diagrammatic lateral view of an assembly according to the invention, and FIG. 3 shows a series of diagrams showing different operative parameters of the engine during a sequence of gear shiftings.

FIGS. 1 and 2 show schematically an engine-gearbox assembly for a motorcycle, indicated at 10. The assembly 10 comprises, in a way per se known, a crankshaft 12 which is connected to a gearbox schematically indicated at 14 by means of a friction clutch which is operated by a lever 17 placed on the handlebar of the motorcycle. The output shaft of the gearbox 14 is indicated at 18. The gearbox 14 is a sequential gearing which, in a way per se known, is operated by a rotatable cylinder 20 on which double-effect cams are formed which sequentially change the selected gear as a function of the angular position of the cylinder 20. A pedal 22 can be operated in a traditional way for varying the angular position of the cylinder 20 and consequently shifting gear. The friction clutch 16 and the gearbox 14 are enclosed in a box 24 together with a gear pump 26 which, driven by the engine, feeds the hydraulic circuit of the internal combustion engine with lubricating oil.

In a fully conventional way, the engine is provided with a throttle valve 28 which controls the immission of the combustible mixture. The throttle valve 28 is controlled by a hand grip 30 placed on the handlebar of the motorcycle.

The gear selection pedal 22, the friction control lever 17 and the gas hand grip 30 represent manually operated control means for shifting gears in a traditional motorcycle.

In accordance with the present invention, the engine-gearbox assembly 10 comprises, in addition to the previously disclosed manual control means, a series of actuators, preferably hydraulic, which enable the gear shifting to be carried out in a servo-assisted manner in the way which will be disclosed in the following. The servo-assisted gear shifting is controlled by an electronic control unit 32 which receives a gear shift command form a pair of push-buttons 34, preferably placed on the handlebar, through which the driver imparts either up-shifting or down-shifting commands.

A first hydraulic actuator 36 is provided for operating the friction clutch 16 independently of the manual control lever 17. A second hydraulic actuator 38 is provided for rotating the cylinder with double-effect cams 20 and a third hydraulic actuator 40 is provided for varying the position of the throttle valve 28 independently from the position imparted by the manual hand grip 30. Therefore, the clutch 16, the gear box 14 and the throttle valve 28 can be indifferently actuated either manually or in a servo-assisted manner.

A hydraulic control unit 42 comprises an accumulator 44 and a plurality of electric valves 46, 48, 50 and 52, controlled by the electronic control unit 32. In accordance with a particularly preferred embodiment of the present invention, the hydraulic circuit which controls the actuators 36, 38 and 40 uses as a control fluid the same oil used for lubricating the engine. The gear pump 26 is used for producing the pressurised oil flow necessary for feeding the hydraulic actuators 36, 38 and 40. The electric valve 46 feeds the actuator 40 which operates a control lever which rotates the throttle valve for increasing the flow of combustible mixture with respect to the quantity set by means of the manual hand grip 30. The electric valve 48 is of a type either with proportional flow rate or proportional pressure and feeds the actuator 36 which controls engagement and disengagement of the friction clutch 16 independently from the position of the manual lever 17, as disclosed in detail in a contemporaneous patent application of the same applicant. The electric valves 50 and 52 feed the double-effect actuator 38 which is moved in a first direction for up-shifting and in the opposite direction for down-shifting.

The engine-gearbox assembly according to the present invention is also provided with two speed sensors 54, 56 which send to the electronic control unit 32 signals indicating the rotational speeds of, respectively, the crank shaft 12 and the gearbox output shaft 18. A sensor 58 sends to the electronic control unit 32 a signal indicating which gear is engaged and this information is displayed on a display 60 placed on an instrument panel. A sensor 62 for detecting the operative state of the friction clutch 16 (engaged/disengaged) and a sensor 64 for detecting the aperture angle of the throttle valve 28 are also provided.

The electronic control unit 32 can also be programmed for temporarily interrupting the power supply to the ignition coil 66, for instance through a relay 68, or by sending an interruption command to an engine control unit, for reducing the speed of rotation of the engine during up-shifting.

The diagrams of FIG. 3 explain the operation of the system according to the invention and show for some characteristic operating phases, indicated A, B, C, D, D', E, E' and F the variation of the main characteristic parameters of the system, constituted by selected gear, state of the friction clutch, speed of the vehicle, engine r.p.m., position of the throttle valve, and shifting command.

The phase A represents a starting situation in which the vehicle is stationary in neutral, engine idling and throttle valve in idling position. The friction clutch is engaged and there is no shifting command. Starting from this situation, in phase B the friction clutch is manually disengaged and the up-shifting push button is depressed (shifting command "up"). At the end of the phase B the friction clutch is disengaged, the throttle valve and the engine are idling and the vehicle is still stationary. The first gear has been engaged in a servo-assisted manner.

During the phase C, the throttle valve is moved, for instance, from the idling position to a full-gas position though a rotation of the hand grip 30 and the engine r.p.m. raises progressively to the value G1. By progressively engaging the manually operated friction clutch, the speed of the vehicles raises and at the end of the phase C the system is in a situation in which the first gear is engaged, the friction clutch is engaged, the speed of the vehicle has reached a certain value V1 and the engine r.p.m. has reached a value G1. It has been supposed that in the following phase D the position of the throttle valve is maintained constant, for instance in the position of full-gas, and an upshifting command is imparted. The electronic control unit 32 reacts to the shifting command by disengaging in a servo-assisted manner the friction clutch and by inserting also in a servo-assisted manner the upper gear. Preferably, the electronic control unit 32 reduces the engine r.p.m. before inserting the upper gear. This can be obtained for instance by temporarily switching-off the power supply to the ignition coil 66 through the normally closed relay 68 or by sending a suitable command to an ignition control unit. This determines a reduction of the engine r.p.m. from the value G1 to the value G2.

After having inserted the upper gear, the friction clutch is progressively engaged in a servo-assisted manner and the engine r.p.m. and the speed of the vehicle raise progressively. The same sequence is repeated in a similar manner in the phase D' where, after a further "up" command, a further up-shifting occurs from the second to the third gear and the vehicle reaches the speed V3.

Now we will suppose that the vehicle is travelling at a speed V2 with the third gear engaged and with the gas hand grip (throttle valve) in the full-gas position (phase D') and the driver wishes to down-shift in a servo-assisted manner. In the phase E, the driver manually reduces the degree of aperture of the throttle valve, for instance by bringing to the idle position the gas hand grip, and sends a "down" command for down-shifting to the immediately lower gear. The engine r.p.m. is reduced as a consequence of the closure of the throttle valve. In this phase, it is preferable to accelerate the engine for bringing its speed of rotation at an optimal value for the engagement between the primary shaft of the gearbox 11 and the engine crank shaft 12, for preventing locking of the motorcycle rear wheel when the friction clutch is re-engaged. This is obtained in an automatic manner by the actuator 40 which determines the degree of aperture of the throttle valve. An increase of the angle of aperture of the throttle valve is automatically obtained and the engine r.p.m. raises to the value G3. At the same time, the actuators controlling the friction clutch and the gearbox disengage the friction clutch and engage the immediately lower gear. The same sequence is repeated in the phase E' for passing from the second gear to the first gear.

Finally, the phase F represents the phase in which the driver switches to neutral and stops the vehicle using the servo-assisted gear shifting function. For proceeding in this way, the driver manually sets to idling the position of the throttle valve and disengages manually the friction clutch by pulling the lever 17. By imparting a "down" shifting command in the situation in which the throttle valve is in the idling position and the friction clutch is disengaged, the control unit 32 puts the gear box in neutral position N.

In any moment the driver can decide whether to use the servo-assisted shifting by acting on the push-buttons 34 or the traditional manual sequence involving the use of the friction lever 17, the gas hand grip 30 and the gear selection pedal 22.

What is claimed is:

1. An engine gear box assembly for a motorcycle, comprising:

a friction clutch;

at least two gears;

a throttle valve;

manual control means for the clutch, gears and valve;

an electronic control unit to selectively operate the clutch, gears and valves in an automated fashion; and a plurality of hydraulic actuators for controlling each of said clutch, gears and throttle valve.

2. The assembly of claim 1, whereby the hydraulic actuators are controlled by a hydraulic control unit.

3. The assembly of claim 2, whereby the hydraulic control unit includes an accumulator and a plurality of electric valves.

4. The assembly of claim 2, whereby the hydraulic control unit is controlled by the electronic control unit.

5. The assembly of claim 1, wherein the actuators are operated with lubricating oil from an engine of the motorcycle.

6. The assembly of claim 2, further including sensors to sense at least one condition related to each of the clutch, gears and throttle valve, the sensors relaying information to the electronic control unit.

7. The assembly of claim 1, wherein the electronic control unit is programmed for reducing the speed of rotation of the engine before engaging an upper gear.

8. The assembly of claim 1, wherein the electronic control unit is programmed for increasing the speed of rotation of the engine before engaging a lower gear.

* * * * *